May 5, 1925.                     1,536,634
             W. A. SHIPPERT ET AL
                 MILKING APPARATUS
           Filed Nov. 21, 1921        4 Sheets-Sheet 1
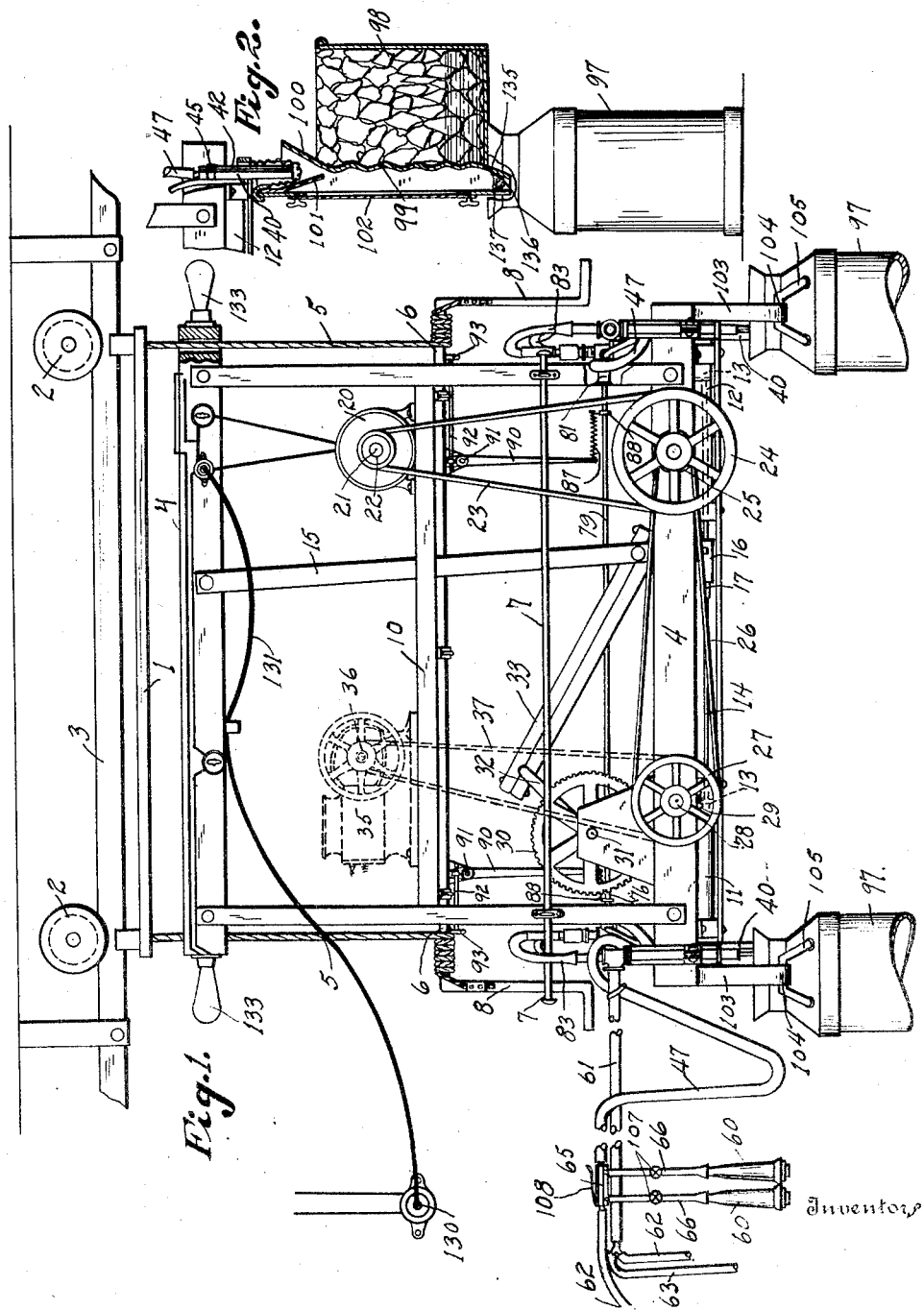

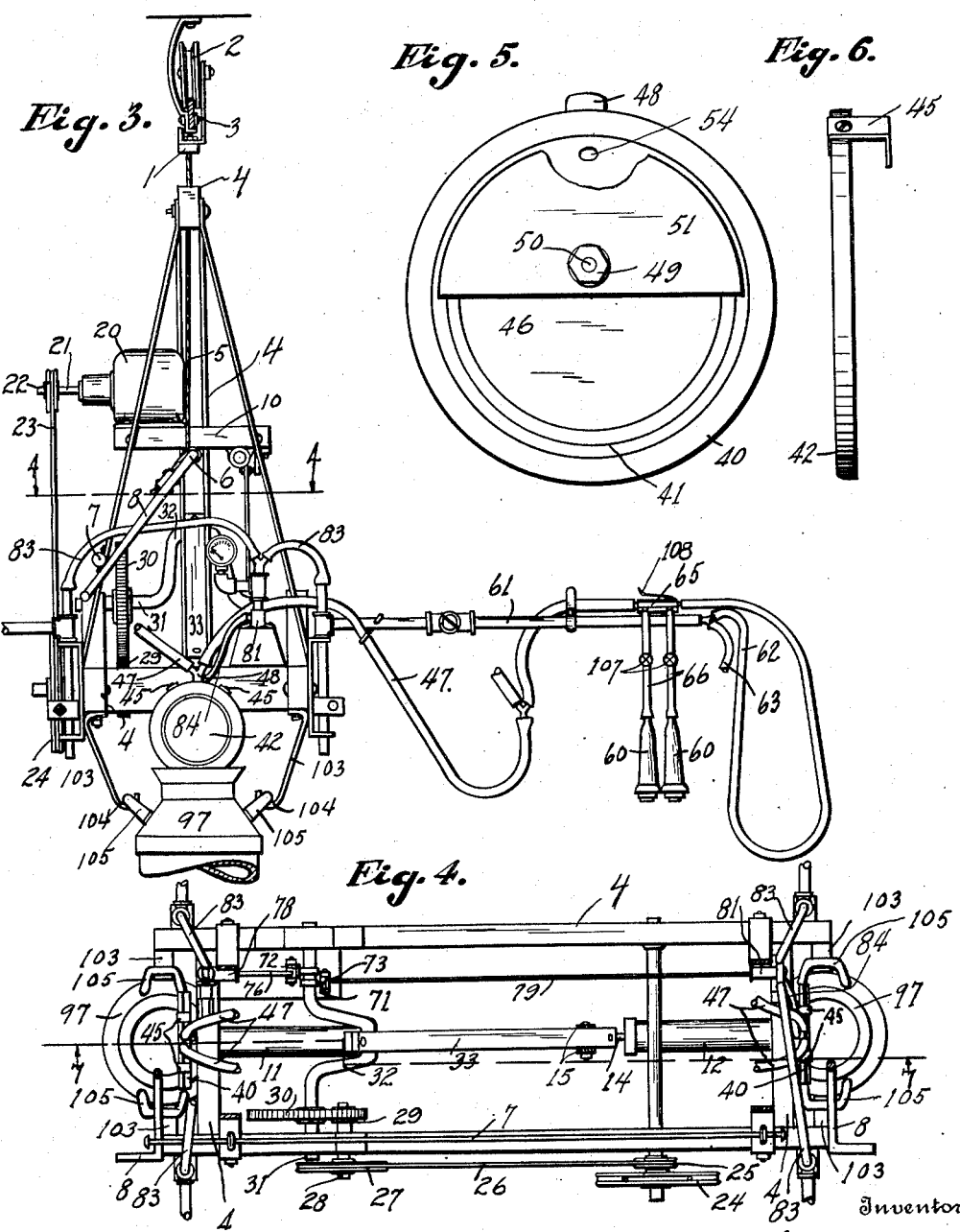

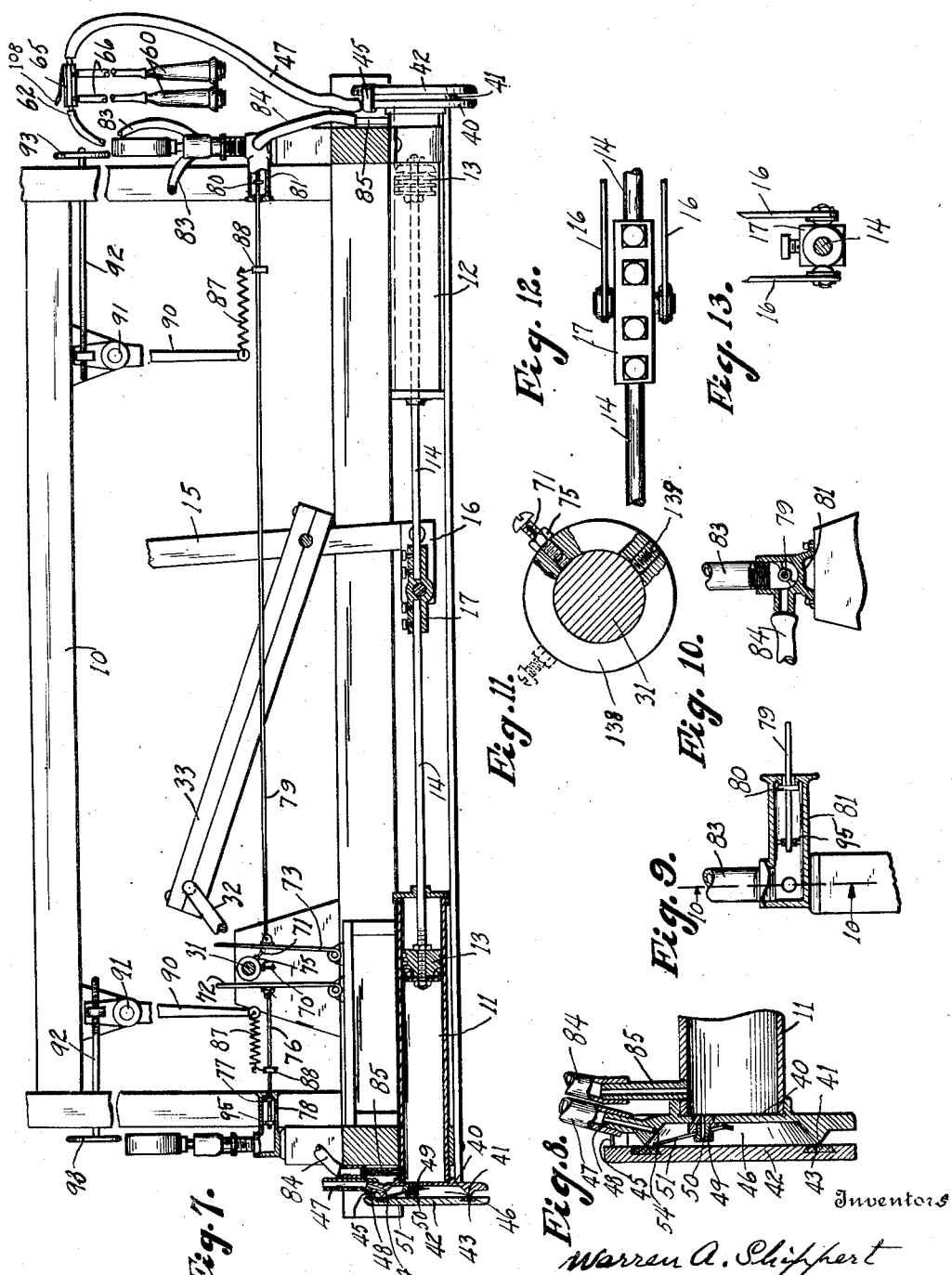

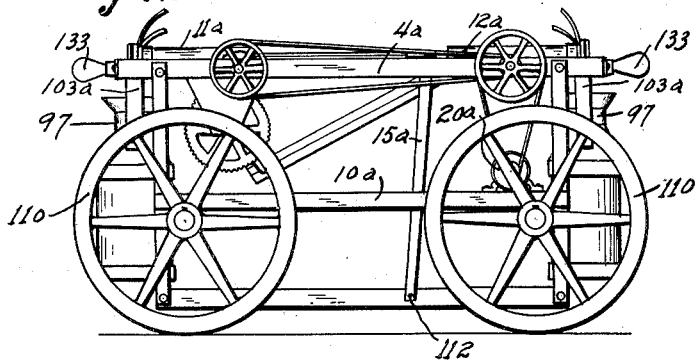
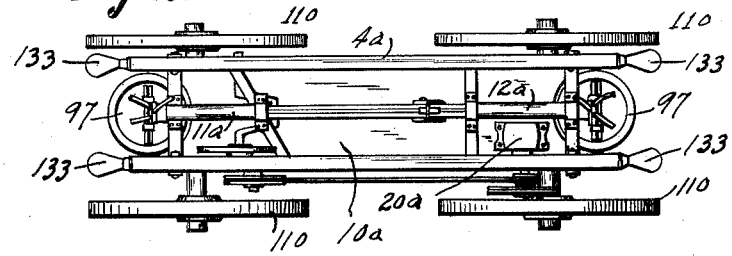
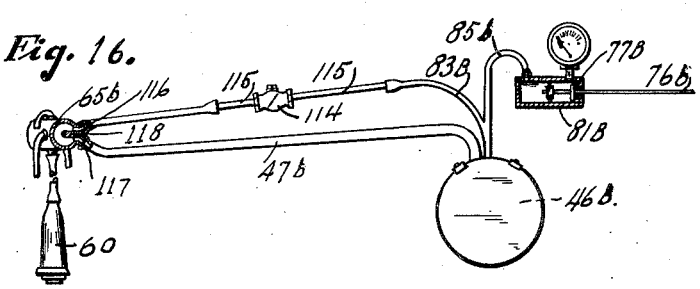
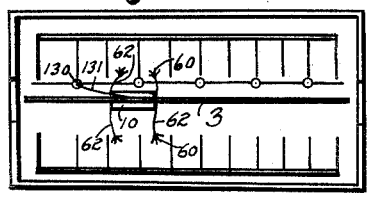
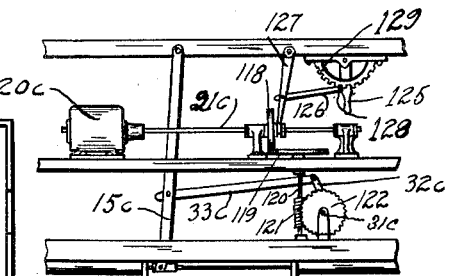

Patented May 5, 1925.

1,536,634

UNITED STATES PATENT OFFICE.

WARREN A. SHIPPERT, OF DIXON, ILLINOIS, AND GEORGE BAILEY, OF MILWAUKEE, WISCONSIN.

MILKING APPARATUS.

Application filed November 21, 1921. Serial No. 516,810.

*To all whom it may concern:*

Be it known that we, WARREN A. SHIPPERT and GEORGE BAILEY, citizens of the United States, residing at Dixon and Milwaukee, respectively, counties of Lee and Milwaukee, respectively, and States of Illinois and Wisconsin, respectively, have invented new and useful Improvements in Milking Apparatus, of which the following is a specification.

Our invention relates to improvements in milking apparatus.

One object of our invention is to provide portable apparatus of such character as to eliminate the necessity for equipping stables with multiple pipes, movable rods or bars, or other complex mechanisms adapted to be operated from a motor located at a distant point, our invention contemplating the use of a carrier for transporting the complete equipment, including a motor (internal combustion engine or electric motor) from place to place thruout the length of the stable.

A further object of our invention is to provide means for promptly reducing the temperature of the milk with minimum exposure to bacterial infection preparatory to its delivery into a receiver, such as a milk can or pail, whereby the beneficial results of pasteurization are obtained without the disadvantages resulting from a resort to sterilizing temperatures after the milk has become infected to an extent which makes pasteurization necessary.

Further objects of our invention are to provide means to facilitate the milking of a considerable number of cows simultaneously; to provide improved means for equipping the various ducts or passages in a sanitary condition; to prevent fouling the air lines with milk; to provide improved means for controlling the degree of suction, the length of the suction interval, and the character of the relief from vacuum conditions; and to utilize air admitted to the teat cups to enforce a complete delivery of the milk from such cups to the receiver at the end of each suction interval, regard being had for convenience, expedition, reliability, and general efficiency.

In the drawings:—

Figure 1 is a side elevation of milking apparatus embodying our invention in its preferred form with the apparatus wholly supported by a carrier from an overhead track.

Figure 2 is a detail view, partly in vertical section, showing the refrigerator and associated parts in operative relation to the milk receiver or can.

Figure 3 is an end elevation of the apparatus disclosed in Figure 1.

Figure 4 is a plan view, partly in section, indicated by line 4—4 of Figure 3.

Figure 5 is a view of the outer end of one of the pump cylinders showing the milk receiving head with the outer wall removed.

Figure 6 is a side view of the outer wall detached.

Figure 7 is a longitudinal sectional view of the carrier and associated parts drawn generally on line 7—7 of Figure 4.

Figure 8 is a detail view in vertical section thru the central portion of the milk receiving head, including a fragment of the pump cylinder and the air line connection.

Figure 9 is a detail view of the relief valve and associated parts, the valve casing being shown in section.

Figure 10 is a sectional view on line 10—10 of Figure 9.

Figure 11 is a side view, partly in section, of one of the valve operating cams showing the adjustable actuating stem or screw.

Figures 12 and 13 are detail views showing fragments of the pump operating connections.

Figure 14 is a side elevation showing our invention in modified form as it is applied to an ordinary four-wheeled vehicle.

Figure 15 is a top view of the upper portion of the vehicle frame.

Figure 16 is a detail view in modified form of the air relief connections.

Figure 17 is a side view, in modified form, of power transmitting connections adapted to be utilized in connection with an electric motor.

Figure 18 is a diagrammatic view illustrating the relation of the machine to stalls on each side of a passage.

Like parts are identified by the same reference characters thruout the several views.

In the embodiment shown in Figures 1 to 13 inclusive, the overhead carrier 1 is supported by wheels or rollers 2 from a track 3. The frame 4 of the apparatus is suspended from the carrier 1 by cables 5, the upper ends of which are secured to the carrier, the lower ends being wound upon a manually operable crank shaft 6 which is normally held against rotation by a locking rod 7 mounted to slide in suitable frame bearings longitudinally of the machine, whereby the rod 7 may be drawn out at either end of the machine to engage one of the cranks 8. When the rod 7 is in neutral position, either crank 8 may be operated to raise or lower the frame 4.

The frame 4 is provided with a platform 10 adapted to receive a motor. It is also provided at, or near its base, with a pair of horizontally disposed air pump cylinders 11 and 12, preferably located adjacent to the respective ends of the machine, whereby the pistons 13 may be connected by piston rods 14 and actuated from a swinging lever 15 thru links 16 pivoted to the lower end of the lever 15 and to a coupling member 17 connected with the rods 14, as clearly indicated in Figures 12 and 13.

The pump actuating lever 15 is driven from a motor mounted on a platform 10. If the electric motor 20 is employed, a motion is transmitted therefrom thru the motor shaft 21, pulley 22, belt or chain 23, pulleys 24 and 25, belt or chain 26, pulley 27, shaft 28, pinion 29, gear wheel 30, shaft 31, crank 32, and the connecting rod or bar 33.

If an internal combustion motor is employed, it will preferably be located as indicated by dotted lines at 35 and power transmitted therefrom thru the pulley 36 and belt or chain 37 directly to the pulley 27, the speed of such a motor being considerably less than that of the electric motor 20.

Each of the pump cylinders 11 and 12 is provided at its outer end with a head 40 having an annular rib or bearing member 41 adapted to receive a disk 42 provided with annular packing ring 43 dove-tailed to its inner face and adapted to bear upon the rib 41 when the disk 42 is in one position of adjustment. The disk 42 is suspended from the cylinder head 40 by a set of hook-shaped hangers 45, one on each side of the vertical center line, the arrangement being such that the disk may move freely toward and away from the rib 41. When it is pressed against the rib 41, the packing 43 forms an air tight joint and the disk is spaced from the cylinder head 40, thus forming a receiving chamber 46 into which milk may be delivered thru the hose pipe 47 and nipple 48.

A fitting 49 is connected with the cylinder head 40 and provided with a port 50 thru which air may be drawn into the cylinder 11 (or 12) during the suction stroke of the piston in such cylinder. A baffle plate or shield 51 extends obliquely in the chamber 46 and is preferably supported by the fitting 49, the shield 51 being so located as to direct the milk downwardly and laterally from the milk inlet port 54 to the lower portion of the chamber 46, thereby preventing the milk from being drawn thru the port 50 into the pump cylinder. The shield 51 is formed to direct the milk against the outer surface of the cylinder head 40 and cause it to flow without splashing or spattering to the lower portion of the chamber.

Sets of teat cups 60 are supported from the frame by a tubular swinging arm 61, the outer end of which is provided with branched flexible pipes or rubber tubes 62 and 63, each connected with a set of teat cups by a claw or chambered fitting 65 of ordinary construction, the cups 60 being connected to this fitting by individual hose pipes 66. The hose pipe 47 conveys the milk from the claw and delivers it to the receiving chamber 46 thru the port 54 in the nipple 48.

Intermittent suction is applied to the teat cups at the respective ends of the machine frame by the inward movement of the associated piston 13 which withdraws air from the receiving chamber 46. The vacuum in this chamber 46 extends outwardly thru the hose pipe 47, claws 65, and individual ducts 66 to the respective teat cups 60. This vacuum is then relieved (preferably before the piston reaches the end of its inward stroke) by the admission of air to the claws 65 and to the cylinder in which the vacuum is being created. The means for controlling such air admission will now be described.

It will be observed in Figure 7 that shaft 31 is provided with projections 70 and 71 which are adapted to perform the functions of cam projections to actuate levers 72 and 73 respectively, each at one stage in the revolution of the shaft 31. Each of these projections 70 and 71 comprises a headed screw secured by a lock nut 75, the arrangement being such that the screw may be turned outwardly or inwardly to increase or diminish the radius of the projection. The lever 72 is connected by rod 76 with an air valve 77 located in the valve casing 78. The other lever 73 is connected by a similar rod 79 with a corresponding air valve 80 in the casing 81 at the other end of the frame. Each of the valve casings 78 and 81 is connected by hose pipes 83 with the respective claws 65 and is also connected by pipes 84 with the ported nipples 85 at the outer ends of the associated pump cylinders 11 and 12.

The air valves 77 and 80 are automatically closed by suitable springs when not held open by the actuating cam projections 70 and 71. Springs 87, adapted for this purpose, are illustrated in Figure 7. These springs are attached to suitable couplings 88 on the valve rods or stems 76 and 79 and the other ends of the springs are connected with levers 90 pivoted at 91 to the frame and positioned by adjusting screws 92 having hand wheels 93, whereby the tension of the springs may be regulated. The valve actuating rods 76 and 79 have their outer ends supported in bearings 95, the movement of the levers 72 and 73 being short, each lever being in a vertical position when its associated valve is seated. Accurate seating is possible, notwithstanding the slight swinging movement of the valve stem or rod at the end which is connected with the operating lever. The rods are somewhat flexible or resilient and their length is such as to avoid all difficulty in properly operating the valve 77, bearings being provided where the rods pass into the fittings 78 and 81 respectively.

*Timing.*

The purpose of having the projections 70 and 71 adjustable is principally to regulate or control the length of the suction interval. In the milking machines heretofore used and which pertain to the type in which suction is directly dependent upon the direction of piston movement in the vacuum producing pump, it has been customary to allow the pump itself to determine the length of the suction interval and in such cases the intervals of milk withdrawal and relief are ordinarily substantially equal, the suction being maintained during the movement of the piston in one direction and then gradually relieved during the movement in the opposite direction, complete relief being attained only when the piston is approaching the end of its return stroke. But by employing the valves 77 and 80, it is possible to provide instant and complete relief from vacuum in the teat cups at any stage of piston movement. By locating the cam projections 70 and 71 in proper relation to the shaft 31, it is possible to admit air to either cylinder at any desired stage of the suction stroke of the associated piston and by adjusting the length of the cam projection, the relief from suction may be continued until the piston reaches the end of its stroke. The relief will then continue during the return movement of the piston, thereby providing a long interval of complete rest for the tissues of the teats and udder followed by a relatively short period of suction which may be just sufficient to withdraw the milk from the teats without subjecting them to strain when empty.

*Refrigeration.*

The receiving cavity or chamber 46 formed at the respective ends of the cylinders is circular in form and narrow between its front and rear walls, thereby allowing rapid radiation and conduction of heat through the walls. After the suction has been relieved, as above explained, and during the return stroke of the piston in either cylinder, the air which has been admitted to the cylinders will be driven out thru the port 50 into the chamber 46 and the disk 42 will be pushed outwardly, thereby opening the chamber 46 for a delivery of the milk in a thin sheet between the ribs 41 and the packing ring 43. The pressure is light, no resistance being offered to the opening movement of the plate 42 other than the weight and inertia of the plate, the quantity of milk will be comparatively small and it will therefore be delivered radially and in such a thin sheet or film that its temperature will almost immediately be reduced to that of the surrounding atmosphere. By providing a receiving funnel shaped passage having front and rear walls in proximity and side walls widely separated at the top and converging downwardly, the milk may be delivered into a receptacle or can 97 at a temperature which may be regulated by associating a refrigerating chamber 98 with one of the walls 99 of the funnel, said wall 99 being preferably corrugated to increase the area of the heat absorbing surface exposed to the milk and to the action of the refrigerant. The wall 99 preferably has an oblique portion 100 near its upper margin to provide a flaring mouth for the funnel and a deflector 101 is preferably employed to direct the milk against the corrugations. The inner or back wall is preferably provided with a removable section 102 to afford access to the interior of the funnel and facilitate cleaning the same.

Hook-shaped hanger members 103, preferably formed of resilient material, are connected with the respective ends of the machine frame, the hooks 104 being adapted to engage the handles 105 of ordinary milk cans. The latter may thus be suspended from the frame 4 of the apparatus and conveyed from point to point in the stable where milking operations are to be performed. When filled, the can 97 may be removed and replaced by an empty can.

*Operation.*

The track 3 will preferably be extended thru a stable above the passage-way or alley which is ordinarily provided between rows of stalls. The entire apparatus, including the motor, may therefore be pushed along the track-way to the desired point, no lifting or carrying operations being required. The motor is then started and sets of teat cups are placed in operation at either or both sides of the alley or passage-way, multiple sets of cups being provided at each end of the machine whereby it is possible to milk four, six, or even eight cows simultaneously. Each teat cup claw may be provided with valves 107,—one for each individual cup and a main valve 108 may also be provided, whereby the suction may be entirely cut off from any set of cups as soon as the milking operation is completed, whether such cups are withdrawn from the teats or not. The valves for the individual cups are employed in cases where one portion of the udder drains more quickly than the other portion, it being undesirable that the suction be continued after the milk ceases to flow. Each cup may be formed of glass, or provided with a sight glass permitting observation.

By admitting air to the claw after each suction interval, the cups may be kept empty and the teats dry. It has been found by observation that the milk withdrawn during a single suction interval, will pass directly thru the claw into the milk line between it and the vacuum chamber and that by allowing air to enter the claw at the end of each suction interval the milk line may be kept free from milk thruout the entire milking operation, instead of allowing the milk to accumulate in the rubber tube until it fills the claw and the lower ends of the teat cups as is the case in the use of ordinary milking machines. The accumulation of milk in the milk line, not only reduces the effective suction on the teats and by its inertia delays the initial suction, but it allows a portion of the milk to be driven backwardly when air is admitted to the vacuum or releaser chamber, relief from the vacuum pull being afforded only by the return of milk to the cups. By the improved construction herein described, no milk is allowed to accumulate in the milk line and therefore during each suction stroke, the milk passes entirely into or thru the claw, none being left in the cups or their individual connections, to be driven back against the teats by the incoming air.

*Modified form.*

In Figures 14 and 15 my invention is illustrated as mounted upon an ordinary four wheeled vehicle adapted to be pushed along the floor of the stable. A frame like that disclosed in Figure 1 may be inverted and mounted on a four wheeled truck, the pumps being thus located at the top. The same reference characters with the letter " a " added are applied to the corresponding parts of the mechanism, whereby the construction may be readily understood without further detailed description.

The wheels 110 support the frame $4^a$, which carries the motor and the operating mechanism. The motor $20^a$ is supported upon an intermediate platform $10^a$, and the power transmitting connections, including the reducing pulleys and gear wheels, are preferably located in the upper portion of the frame. The position of the pump actuating lever $15^a$ is reversed, this lever being pivoted to the lower portion of the frame as indicated at 112. The pump cylinders $11^a$ and $12^a$ are preferably located at the top of the frame in order to provide sufficient space for the milk cans 97. These are supported from the truck by the arms $103^a$. Otherwise, the apparatus may be assumed to be the same as above described with reference to Figures 1 to 13 inclusive.

Referring to Figure 16, which shows air relief connections in modified form with the letter " b " added to the corresponding parts, it will be observed that the valve casing $81^b$ is provided with a valve $77^b$ corresponding with the valve 77 shown in Figures 7 and 9. But the valve casing has only one air outlet duct $85^b$. This leads to the pump cylinder but connects at a short distance from the casing with a branch $83^b$ leading to the claw $65^b$. A check valve 114 is provided at a convenient point in the duct $83^b$. Sections of metal tubing 115 may be employed, if desired, thereby shortening the lengths of rubber tubing required to complete the air line to the claw $65^b$. In this construction the claw $65^b$ may be circular in form and the air inlet shown at 116 may be so disposed that the air will enter tangentially to drive out the milk thru the milk line $47^b$. The outlet of the claw at 117 is disposed on the opposite side of the partition 118 between the air inlet port and the milk outlet port 117. The duct $47^b$ delivers the milk to the chamber $46^b$, in the same manner as above described with reference to Figure 8.

Figure 17 shows a modified form of power transmitting and speed reducing mechanism, the letter " c " being added to the reference numerals indicating the parts corresponding with those disclosed in Figures 1 to 13 inclusive. In this construction the motor $20^c$ has an extended shaft $21^c$ upon which a friction disk 118 is mounted. The periphery of this disk bears upon the side face of a co-operating friction disk 119. The disk 119 is mounted on a worm shaft 120 provided with a worm 121 in mesh with a worm wheel 122. This worm wheel 122 is mounted upon a shaft $31^c$ corresponding with the shaft 31 shown in Figure 1. The crank $32^c$ operates the swinging pump actuating lever $15^c$ thru the pitman or connecting rod $33^c$.

With this construction, the speed may be varied by shifting the friction wheel 118 radially along the surface of the friction wheel 119. The friction wheel 118 is shifted by manually operating the lever 125 and this lever transmits its motion to the friction wheel 118 thru the connecting rod 126 and shifting lever 127. The lever 125 may be provided with a dog 128 adapted to engage the toothed segment 129 to lock the lever in the desired position of adjustment. Electrical power to operate the motor may be supplied from suitable line wires or conduits in the stable, sockets or outlets being provided at intervals to receive plugs or couplings 130 attached to the flexible conductors or feed wires 131 carried by the frame. When the carrier is moved, the plugs 130 may, if necessary, be withdrawn from their sockets and moved to other sockets adjacent to the new station of the carrier. In the same manner, or by similar means, current may be supplied to lamps 133 mounted on the frame.

If desired, the refrigerating chamber 98 may be provided with a settling chamber 135 at the lower end of the milk passage and the outlet of this chamber may have a filter 136 containing absorbent cotton or other filtering material 137 thru which the milk passes to the can.

Referring again to Figure 7, it will be obvious that by adjusting the screw 92, the tension of spring 87 may be so adjusted or regulated as to limit the degree of vacuum to be produced in the system, the valve 77 being drawn open, or forced open by atmospheric pressure when the vacuum exceeds a predetermined degree.

It is also obvious from Figure 7 and Figure 11 that the cams or cam projections 71 may be rotatably adjusted on the shaft 31, each of these projections 71 being carried by a collar 138 normally locked to the shaft by a set screw 139. By loosening the set screw, the collar may be turned, thereby varying the length of the suction interval by mechanically opening the valve 77 to relieve the suction at any point in the movement of the piston within the cylinder either on the suction stroke, or on the return stroke.

We claim:—

1. In a milking apparatus, the combination with a vacuum chamber, of a vacuum producing pump associated therewith, a set of teat cups operatively connected with the vacuum chamber for milk delivery thereto, and means for delivering air into the cup connections to drive the milk from said connections into the vacuum chamber.

2. In a milking apparatus, the combination with a set of teat cups and associated vacuum chamber, means for intermittingly withdrawing air from said chamber, and co-operating means for admitting air to the teat cup connections to drive the milk from the teat cup connections into such chamber, said vacuum chamber being adapted to open under interior pressure in excess of that of the surrounding atmosphere.

3. Milking apparatus, including a vacuum chamber, means for alternately withdrawing air and delivering milk from said chamber, a set of associated teat cups having flexible tubular connection with said chamber, and means controlled by the vacuum producing means for automatically admitting air to the teat cup connections adjacent to the teat cups after a predetermined interval of suction.

4. Milking apparatus, including the combination with a vacuum chamber, a pump for intermittingly withdrawing air therefrom provided with a reciprocating plunger, a set of teat cups connected for milk delivery to the vacuum chamber, pump operating devices, and means connected therewith for relieving the vacuum in the teat cups during the suction stroke of the pump plunger.

5. Milking apparatus, including the combination with a set of teat cups, of a pump having a reciprocating plunger, and flexible tubular connection with the teat cups adapted, when moved in one direction to withdraw air from the cups, pump operating devices, and means controlled by said devices for admitting air to the teat cup connections while the piston is moving in said direction.

6. In a milking machine, a horizontally disposed pump cylinder provided with a head having a milk receiving vacuum chamber therein, a shield within said chamber, and a set of teat cups connected to deliver milk to said chamber along one side of the shield, said chamber having a passage leading from the other side of the shield to the interior of the pump cylinder.

7. In a milking apparatus, the combination with a pump cylinder, a vacuum chamber constituting a head for the cylinder, and having a movable outer wall, arms connected with the outer wall and extending loosely over the top of the inner wall to slide thereon, an inclined baffle plate in the upper portion of the chamber, and a ported member supporting the baffle plate from the inner wall and affording communication between the space at one side of the baffle plate to the cylinder, the vacuum chamber having a milk inlet port at the opposite side of the baffle plate.

8. In a milking apparatus, the combination with a pump cylinder having one of its heads provided with a vacuum chamber, having a milk inlet port, and a passage communicating between the upper portion of the vacuum chamber and cylinder, and means for directing the milk from the milk inlet in a thin sheet along one of the walls of the chamber and away from the end of the passage, the outer wall of the passage being movable and adapted to be held by pump suction in chamber closing position, and to permit milk delivery when the suction is relieved.

9. In a milking machine, the combination with a vacuum chamber provided with a milk inlet, a milk outlet, and an air outlet, a set of teat cups having flexible connection with the milk inlet, a pump connected with the air outlet, and means for automatically admitting air to the flexible connection, and to the pump at a predetermined stage of each pumping operation.

10. A milking machine, including the combination of a set of teat cups, means for intermittingly withdrawing air therefrom, means for admitting air thereto during the operation of the air withdrawing means, and means for manually timing the operation of the air admitting means.

11. A milking machine, including the combination of a set of test cups provided with flexible tubular connections, a pump adapted to intermittingly withdraw air, and milk therefrom thru said connections, an air admission valve, and pump operating connections provided with means for actuating the air admission valve,—said valve, when open, being adapted to admit the air to the pump and to said connections adjacent to the teat cups substantially simultaneously.

12. A milking machine, including the combination of a set of teat cups provided with tubular connections, a pump adapted to withdraw air from said connections, pump operating devices, an air admission duct leading to said connections and also to the pump, a valve controlling admission of air to said admission duct, and means for utilizing the pump operating devices to open said valve.

13. A milking machine, including the combination of a set of teat cups provided with tubular connections, a pump adapted to withdraw air from said connections, pump operating devices, an air admission duct leading to said connections and also to the pump, a valve controlling admission of air to said admission duct, and means for utilizing the pump operating devices to open said valve, said valve opening means being adjustable to regulate the time of operation.

14. A milking machine, including the combination of a set of teat cups provided with tubular connections, a pump adapted to withdraw air from said connections, pump operating devices, an air admission duct leading to said connections, and cam controlled means connected with the pump operating devices and adapted to mechanically open said valve at a predetermined point in the movement of the pump piston.

15. A milking machine, including the combination of a set of teat cups provided with tubular connections, means for withdrawing air from said connections, and adjustable cam operated means for mechanically admitting air to said connections at a predetermined stage in the operation of the pump.

WARREN A. SHIPPERT
GEORGE BAILEY.